(12) United States Patent
Robertson

(10) Patent No.: US 8,419,361 B2
(45) Date of Patent: Apr. 16, 2013

(54) ANTI FRET LINER ASSEMBLY

(75) Inventor: Daniel Robertson, Derby (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 13/222,583

(22) Filed: Aug. 31, 2011

(65) Prior Publication Data

US 2012/0076659 A1  Mar. 29, 2012

(30) Foreign Application Priority Data

Sep. 23, 2010 (GB) .................... 1015959.8

(51) Int. Cl.
*F01D 25/24* (2006.01)

(52) U.S. Cl.
USPC .............. 415/209.2; 415/209.3; 415/213.1

(58) Field of Classification Search ........... 415/209.2, 415/209.3, 213.1; 416/215, 218, 220 R
See application file for complete search history.

(56) References Cited

U.S. PATENT DOCUMENTS

| | | | |
|---|---|---|---|
| 5,073,084 A | | 12/1991 | Hirst |
| 5,141,395 A | * | 8/1992 | Carroll et al. ............ 415/196 |
| 5,257,909 A | * | 11/1993 | Glynn et al. ............ 416/220 R |
| 5,318,402 A | * | 6/1994 | Bailey et al. ............ 415/139 |
| 5,320,487 A | * | 6/1994 | Walker et al. ............ 415/173.3 |
| 6,332,617 B1 | * | 12/2001 | Leveaux et al. ............ 277/433 |
| 7,938,626 B2 | * | 5/2011 | Forgue et al. ............ 416/221 |
| 8,246,299 B2 | * | 8/2012 | Razzell et al. ............ 415/173.1 |
| 8,257,028 B2 | * | 9/2012 | Morgan et al. ............ 415/135 |
| 2002/0044870 A1 | | 4/2002 | Simonetti et al. |
| 2012/0128481 A1 | * | 5/2012 | Baumas et al. ............ 415/209.2 |

FOREIGN PATENT DOCUMENTS

| | | |
|---|---|---|
| GB | 2 426 301 A | 11/2006 |
| WO | WO 96/41068 A1 | 12/1996 |

OTHER PUBLICATIONS

British Office Action issued in Application No. 1015959.8; Dated Jan. 18, 2011.
British Search Report issued in Application No. 1015959.8; Dated Jan. 17, 2011.

* cited by examiner

*Primary Examiner* — Edward Look
*Assistant Examiner* — Liam McDowell
(74) *Attorney, Agent, or Firm* — Oliff & Berridge, PLC

(57) ABSTRACT

An anti-fret assembly for a turbine engine, the assembly comprising an elongated liner having first and second walls connected by a base to provide a generally U-shaped channel, the liner having an outer surface adapted to lie against a first component and an inner surface adapted to lie against a second component at least the first wall being provided with a notch for receipt of an anti-translation pin, the assembly further comprising an anti-translation pin.

8 Claims, 4 Drawing Sheets

ANTI FRET LINER ASSEMBLY

This invention claims the benefit of UK Patent Application No. 1015959.8, filed on 23 Sep. 2010, which is hereby incorporated herein in its entirety.

BACKGROUND

The invention relates to an elongate anti fret liner having a component for inhibiting movement of the liner in its direction of elongation. The liner finds particular application in a turbine engine.

Within a gas turbine engine some components, for example vanes, need to be restrained in a manner that resists the aerodynamic or other loads placed upon them during engine operation. The loads can be broken down into two primary components: the axial reaction load along the engine axis and the rotational reaction load about the axis. Both loads are typically transmitted from the gas washed components to a casing.

A gas turbine is an aggressive environment in which liquid lubricants cannot generally be used and materials with dissimilar material properties must make contact. Gas path static components tend to be constructed out of high strength alloys that make contact with casings that are generally constructed out of medium strength alloys. The different thermal coefficients of these materials and the large temperature range experienced by a turbine engine in operation means that it is not possible to rigidly join such components. Therefore the components can move relative to each other resulting in the possibility of wear, usually on the softer component.

To protect the two components an anti-fret liner that is made of material that is softer than either of the interfacing parts is positioned between the two components. Its purpose is to wear in preference to either of the interfacing parts and it may be considered to be a disposable part at engine overhaul. The anti-fret liner and any anti-translation features for the liner should accordingly be cheap to manufacture and easy to remove and replace during overhaul.

It is an object of the present invention to seek to provide an improved anti-fret assembly.

SUMMARY

In accordance with the invention there is provided an anti-fret assembly for a turbine engine, the assembly comprising an elongate liner and an anti-translation pin, the liner having first and second walls connected by a base to provide a generally U-shaped channel, the liner having an outer surface adapted to lie against a first component and an inner surface adapted to lie against a second component, at least the first wall being provided with a notch for receipt of the anti-translation pin.

Preferably the anti-translation pin extends between the first and second walls and protrudes through the notch in the first wall.

The assembly may further comprise a notch in the second wall aligned to the notch in the first wall, the anti-translation pin extending between the first and second walls and protruding through the notch in the first wall and into the notch in the second wall. The pin may protrude through the notch in the second wall.

The notches may be aligned such that they are located at the same distance along the length of the liner and opposed to each other. The anti-translation pin may be straight.

The anti-translation pin may further comprise one or more portions which extend along the channel in the liner. The portions may prevent the pin from becoming detached from the liner during operation of the machinery in which the liner is used.

The protrusion or protrusions of the anti-translation pin may engage an anti-translation feature or features located on the first component. The feature(s) may be a notch or keying element within which the protrusion(s) are inserted.

A second component may be located in the channel in the liner. The second component may have a face that abuts the pin to transfer translational forces to the first component through the pin.

Preferably the first component is a casing in a gas turbine and the second component is part of a vane or sealing element. The liner may be arcuate or linear.

BRIEF DESCRIPTION OF THE DRAWINGS

The invention will now be described with reference to the accompanying drawings and by way of example only in which.

DETAILED DESCRIPTION OF THE EMBODIMENTS

Figure 1:
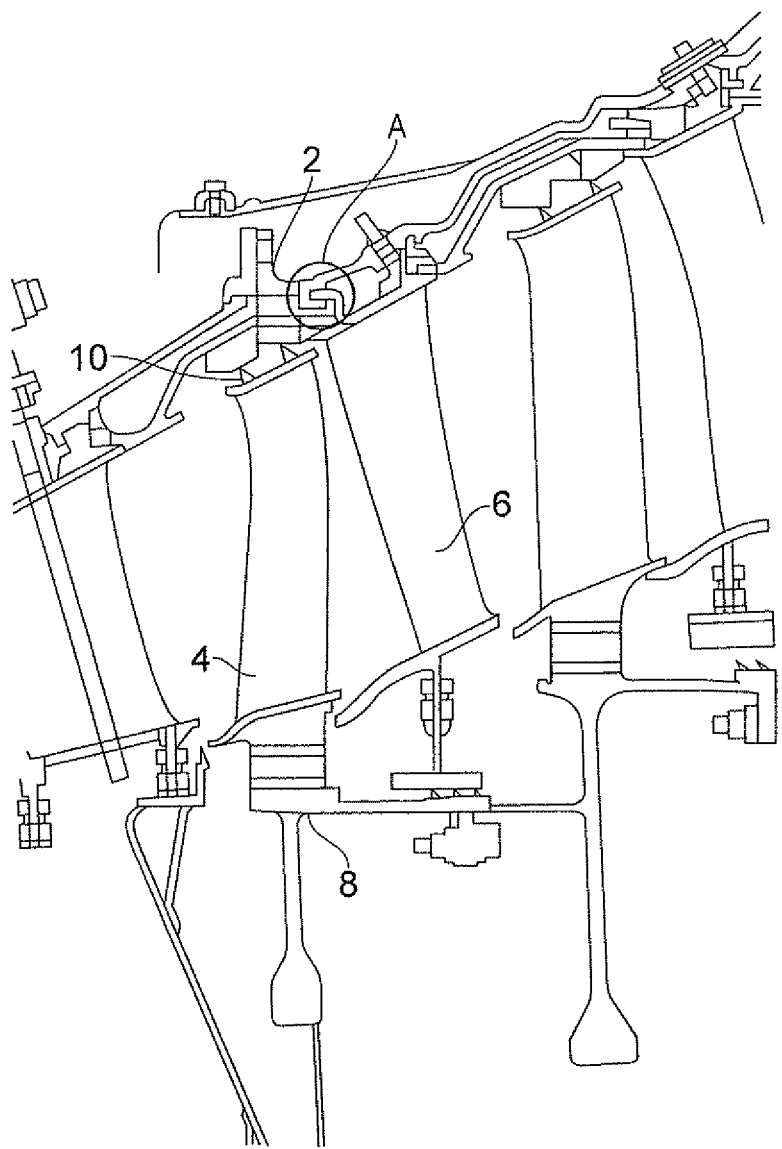
FIG. 1 depicts a section of a gas turbine engine including an anti-fret liner according to the present invention.

FIG. 1 depicts a turbine of a gas turbine engine incorporating the present invention. The turbine has a casing 2 which contains a plurality of rotatable blades 4 and a plurality of static vanes 6. The blades are mounted at the hub to a rotatable disc 8 and are spaced apart from the casing by a narrow gap 10 defined between the shroud at the tip of each blade and an abradable liner mounted on the casing. The blades 4 are not attached to the casing.

In contrast to the blades 4, the vanes 6 are mounted to the casing 2 and are separated from the disc hub by an air gap defined between the seal and the rotatable disc 8. The mounting of the front of the vane 6 to the casing 2 is shown in more detail in FIG. 2, which is an enlarged view of the region marked "A" in FIG. 1. It should be appreciated that the vanes 6 may be mounted to the casing 2 individually or several vanes may be grouped together and mounted as a single vane segment. Several vane segments may be needed to complete an entire circumferential array of vanes 6. The invention will continue to be described by way of an exemplary vane segment.

The gas turbine is an aggressive environment where liquid lubricants cannot be used and materials with dissimilar material properties must make contact with one another. In the case of gas part statics, i.e. vanes, these components tend to be constructed out of high strength, hard, cast alloys that are by their nature segmented parts to avoid issues with thermal gradients. They make contact with casings which are made from medium strength alloys which have a lower hardness.

Due to thermal expansion it is not possible to rigidly attach the gas path statics to their containment casings. Therefore both components have the ability to move against each other. This leads to the possibility of wear (or fretting) occurring, most usually on the softer component.

Figure 2:
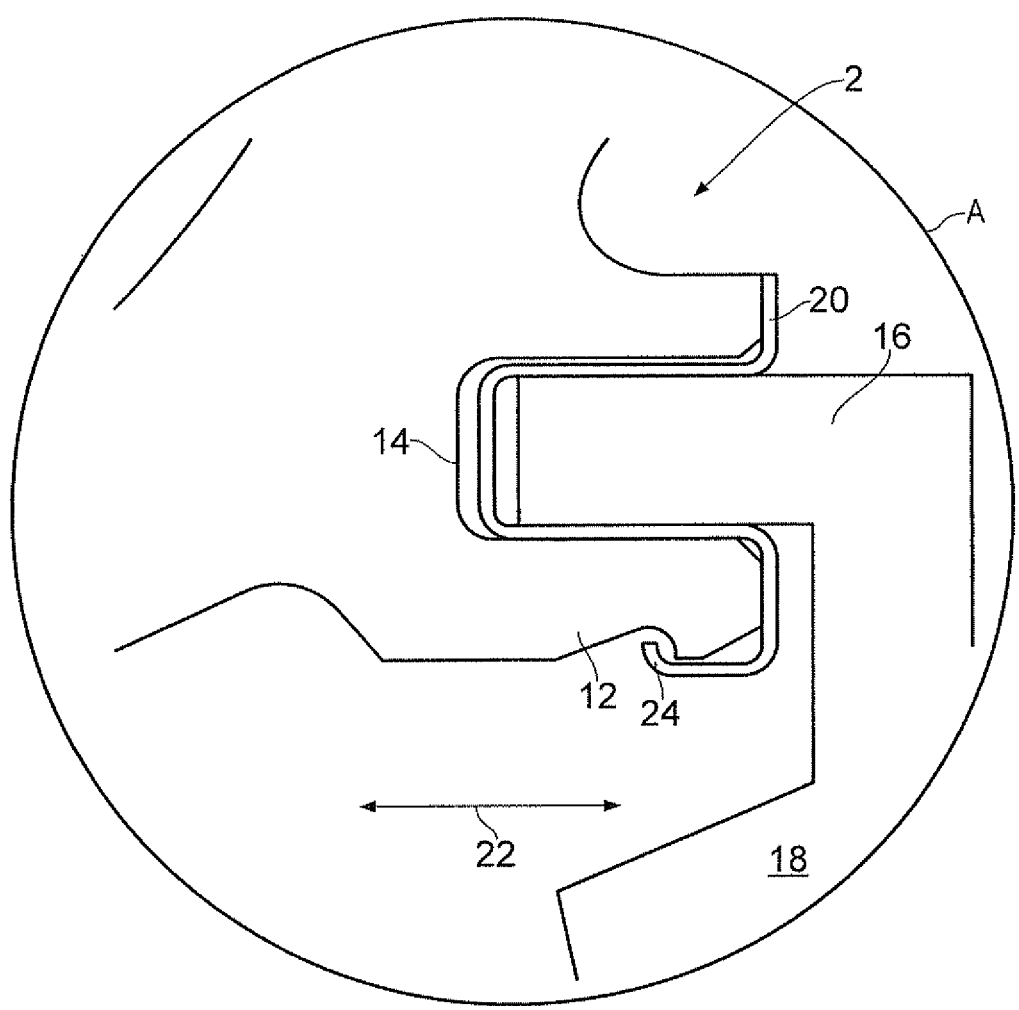
FIG. 2 depicts an expanded version of region A of FIG. 1.

In the embodiment of FIG. 2, the casing 2 is provided with a hook 12 and a channel 14 into which a hook 16 on the vane segment 18 is located. An anti-fret liner 20 is provided between the casing 2 and the hook 16 on the vane segment 18. The liner 20 is made from a softer material than either of the interfacing parts. Its purpose is to wear in preference to either of the interfacing parts and thus is considered a disposable part at engine overhaul.

The anti-fret liner 20 is inserted into and removed from the channel 14 in an axial direction denoted by arrow 22 and is clipped to the hook 12 using clip 24. Preferably the liner 20 is a continuous circumferential hoop but it may be formed from a plurality of parts assembled adjacently in the channel 14 to form a circumference. Beneficially the liner 20 combines the function of preventing rotation of a gas path static while also preventing wear between a gas path static (including, but not limited to, turbine or compressor vanes or seal segments) and a support structure such as the casing.

Figure 3:
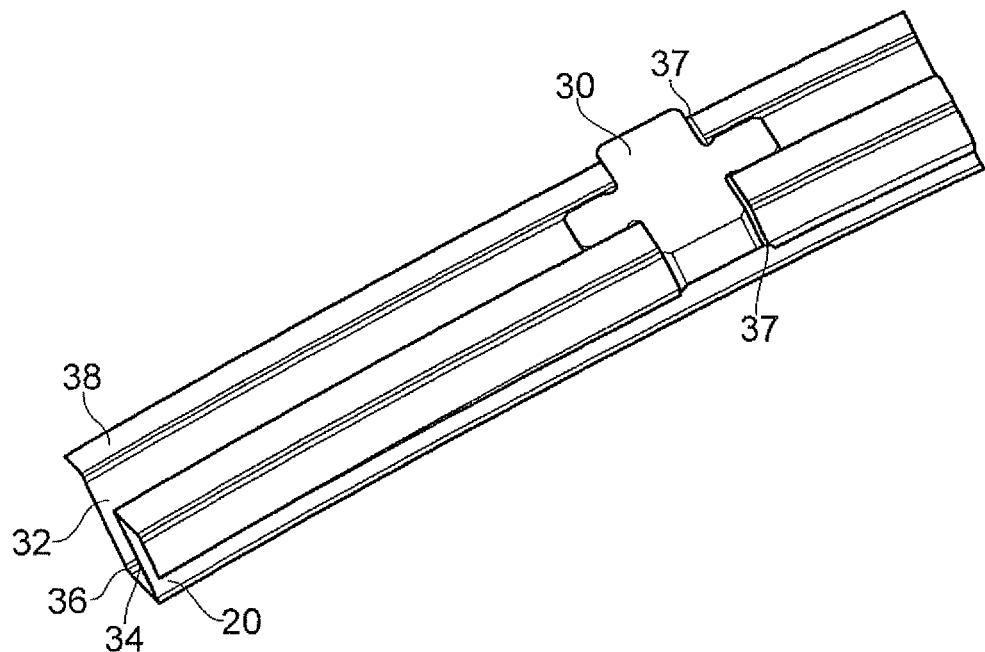
FIG. 3 depicts a perspective view of the anti-fret liner of FIG. 1, further comprising an anti-translation pin.

FIG. 3 is a perspective view of a portion of the liner 20 and an anti-translation pin 30. The liner 20 provides an elongate, generally "U" shaped channel defined by first and second elongate walls 32, 34 and a base 36 connecting the two walls 32, 34. In the embodiment shown in FIG. 3 the liner 20 also has an optional stop face 38 which provides a location feature inhibiting axial movement of the liner 20 towards the hook 12 beyond its intended position, and the optional clip 24 which holds the liner 20 onto the casing 2.

The anti-translation pin 30 extends across the channel between the first and second walls 32, 34 and is positioned within notches 37 formed in each wall 32, 34. The pin 30 is secured to the liner 20 by welding, soldering, brazing or any other suitable method including an interference fit. A portion of the pin 30 projects beyond either one or both of the first and second walls 32, 34 and the portion is used to engage the casing 2 as shown and described later with regard to FIG. 6. Where notches are provided in both of the walls 32, 34 of the liner 20 it is possible to align them so that they are at the same circumferential position on the liner 20.

Figure 4:
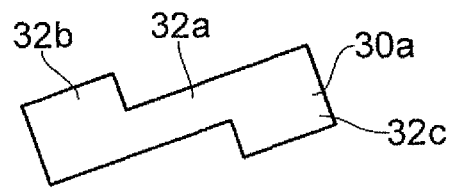
FIGS. 4 and 5 depict alternative shapes for the pin of FIG. 3.
Figure 5:
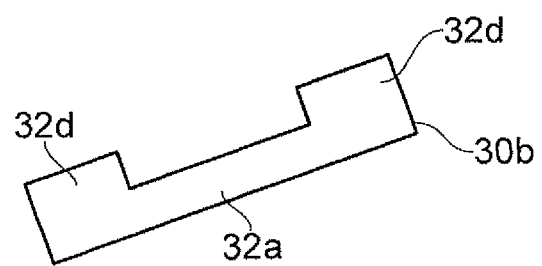

In this arrangement the pin 30 is straight but advantages may be received by using a pin 30 with one or, as shown, two arms that extend along the channel of the liner 20. For example if, in service, the weld holding the pin in place fails, a straight pin may slide from the liner 20 and be caught into the gas flow through the engine which could cause potential damage further downstream in the engine. Where at least one arm is provided the pin 30 cannot drop from the liner 20 during use.

Where the notches 37 are not aligned to the same circumferential point it is possible to use pins 30a of other shapes such as the one shown in FIG. 4 which has a central portion 32a which extends circumferentially within the channel of the liner 20 and radial portions 32b, 32c which extend radially outwards and inwards respectively. If it is only desirable to put notches in one wall of the liner 20 then a pin 30b of the form shown in FIG. 5 may be used, which has an elongate central portion 32a and two ends 32d that each project radially outwards. It will be appreciated that these pin shapes are exemplary and that other shapes as appropriate may be used.

Figure 6:
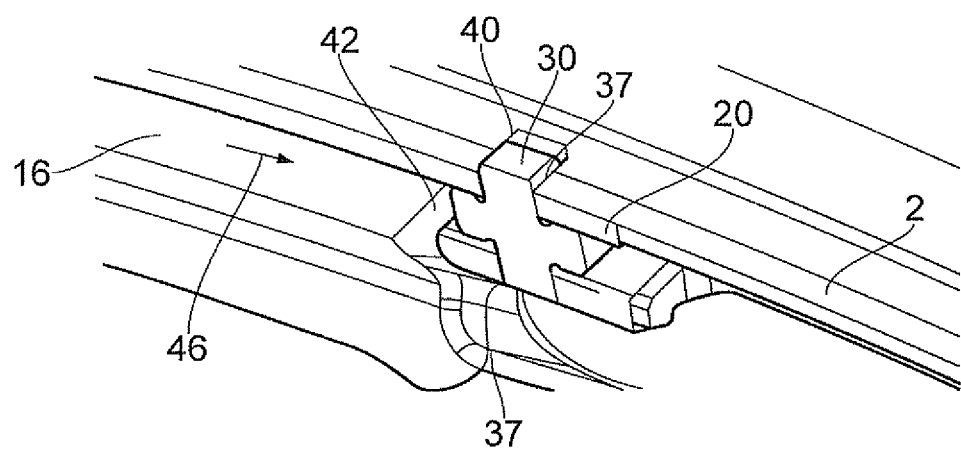
FIG. 6 shows a perspective view of an anti-fret liner according to the present invention assembled in a gas turbine engine.

FIG. 6 depicts a perspective view of the liner 20 in situ within the casing 2 and supporting a vane segment hook 16. The casing 2 is provided with a notch 40 arranged so that when the pin 30 is located in the liner 20 the portion of the pin 30 protruding from the liner 20 engages with the notch 40 in the casing 2. The vane segment hook 16 is located to engage the inner surfaces of the U shaped channel of the liner 20. Although not shown in FIG. 6 the vane segment hook 16 can extend over at least a portion of the pin 30 to butt up to the rear of the pin 30 and prevents it moving rearwards in use should the joint between the pin 30 and the liner 20 fail. Beneficially, the pin 30 and liner 20 assembly is not reliant on the joint strength between the pin 30 and liner 20 to keep the pin 30 in position.

The vane segment hook 16 has a face 42 which engages an end face of the pin 30. The face 42, which may be located towards the end of the vane hook 16, or machined in a more central location, transfers sideways or circumferential translational force from the vane segment 18 or the liner 20 to the pin 30. As the pin 30 is constrained by the notch 40 in the casing 2, sideways or translational movement of the vane segment 18 or liner 20 in the direction of arrow 46 is prohibited.

It is desirable that there is at least one anti-translation pin 30 per vane segment 18 to avoid excessive pressure build up on a selected pin 30. By using multiple anti-translation pins 30 it is possible to divide the liner 20 into multiple discrete sections with each section having at least one pin 30. Beneficially, using multiple anti-fret liners about a circumference reduces the cost of the overall component and reduces the risk of relative movement between gas path components buckling or tearing the anti-fret liner 20.

Whilst the invention has been described with regard to a circumferential arrangement and thus with anti-fret liners 20 that are arcuate and which singularly or together form a circumference, the invention also finds application where the anti-fret liners 20 are linear. The invention has also been described with regard to gas turbines but will also find application in other machinery where there is relative movement between two components and it is desired to mitigate damage with the presence of an anti-fret liner and also to minimise translational movement between the two components.

What is claimed is:

1. An anti-fret assembly for a turbine engine, the assembly comprising an elongated liner and an anti-translation pin, the liner having first and second walls connected by a base to provide a generally U-shaped channel, the liner having an outer surface adapted to lie against a first component and an inner surface adapted to lie against a second component, at least the first wall being provided with a notch for receipt of the anti-translation pin, wherein the anti-translation pin extends between the first and second walls and protrudes through the notch in the first wall and engages at least one anti-translation notch located in the first component.

2. The assembly according to claim 1 further comprising a notch in the second wall aligned to the notch in the first wall, the anti-translation pin extending between the first and second walls and protruding through the notch in the first wall and the notch in the second wall.

3. The assembly according to claim 2, wherein the notches in the first and second walls are aligned to be at the same distance along the length of the liner and the anti-translation pin is straight.

4. The assembly according to claim 2, wherein the assembly is located in a channel provided in the first component, the anti-translation pin includes a plurality of protrusions, the at least one anti-translation notch includes a plurality of anti-translation notches, and wherein each of the protrusions of the anti-translation pin engages a corresponding anti-translation notch located on the first component.

5. The assembly according to claim 1, wherein the anti-translation pin further comprises one or more portions which extend along the channel in the liner.

6. The assembly according to claim 5, wherein the second component is located in the channel in the liner.

7. The assembly according to claim 1, wherein the first component is a casing and the second component is part of a vane.

8. The assembly according to claim 1, wherein the liner is arcuate.

* * * * *